(12) United States Patent
Lui et al.

(10) Patent No.: US 7,369,842 B2
(45) Date of Patent: May 6, 2008

(54) TELEPHONY SERVICE IN EVENT OF LINK FAILURE BETWEEN MOBILE SWITCHING CENTER AND A HOME LOCATION REGISTER OR A SERVICE CONTROL POINT

(75) Inventors: Man Sang Lui, Richmond (CA); Suryadi Wen, Vancouver (CA)

(73) Assignee: UTStarcom, Inc., Alameda, CA (US)

( * ) Notice: Subject to any disclaimer, the term of this patent is extended or adjusted under 35 U.S.C. 154(b) by 333 days.

(21) Appl. No.: 11/289,219

(22) Filed: Nov. 28, 2005

(65) Prior Publication Data
US 2007/0123211 A1  May 31, 2007

(51) Int. Cl.
*H04M 11/00* (2006.01)
(52) U.S. Cl. ............... 455/406; 455/405; 455/407; 455/408; 455/409; 455/432.1; 379/114.2; 379/114.27; 379/114.28; 379/114.29; 379/126; 379/127.01
(58) Field of Classification Search ............... 455/405, 455/406, 407, 408, 409, 432.1; 379/114.15, 379/114.16, 114.17, 114.19, 114.2, 114.28, 379/114.29, 121.04, 126, 127.01, 139, 114.27
See application file for complete search history.

(56) References Cited

U.S. PATENT DOCUMENTS

| | | | |
|---|---|---|---|
| 6,574,464 B1 * | 6/2003 | Chen | 455/406 |
| 6,760,418 B1 * | 7/2004 | Abbasi et al. | 379/115.01 |
| 6,785,534 B2 * | 8/2004 | Ung | 455/406 |
| 2002/0035479 A1 * | 3/2002 | Takae et al. | 705/1 |
| 2005/0100149 A1 * | 5/2005 | Abbasi et al. | 379/114.2 |

OTHER PUBLICATIONS

Michael S. Gallagher et al., "Mobile Telecommunications Networking With IS-41", pp. 59-90, 161-182, McGraw-Hill (1997).

* cited by examiner

*Primary Examiner*—Charles N. Appiah
*Assistant Examiner*—Olumide Ajibade-Akonai

(57) ABSTRACT

A mobile switching center is configured with software instructions which allow it to continue to provide at least limited call termination and call origination services for mobile terminals in the event of a failure of a signaling link between the mobile switching center and a home location register and/or a signal control point (SCP) in an intelligent network. For pre-paid callers originating or terminating a call, the mobile switching center marks a call detail record as indicating that the call is a post-paid call. The call detail record is later provided to the SCP after the signaling link has been restored in order to bill the mobile terminal. In one example, the signaling link between the mobile switching center and the home location register or SCP may be a satellite link, which may go down for various reasons such as for maintenances, an unexpected failure, or the orbit of the satellite goes outside the field of reception of an antenna in the signal path.

14 Claims, 1 Drawing Sheet

TELEPHONY SERVICE IN EVENT OF LINK FAILURE BETWEEN MOBILE SWITCHING CENTER AND A HOME LOCATION REGISTER OR A SERVICE CONTROL POINT

BACKGROUND

1. Field

This invention relates generally to the field of wireless communications and more particularly to a method of providing at least limited telephone service for mobile terminals in the event of a failure on a signaling link between a mobile switching center in which the mobile terminals are registered and either a home location register or a service control point (sometimes referred to as a signal control point).

2. Description of Related Art

The international standards document TIA/EIA/IS-41-D sets forth a network architecture for providing mobile telecommunications and networking. Commercial deployments of mobile telecommunications networks in compliance with IS-41 have occurred in North America and elsewhere. Such systems include a wireless communication network infrastructure (e.g., Code Division Multiple Access (CDMA) cellular telephone network) which includes a multitude of base transceiver stations and associated antennae for communicating over an air interface with roaming mobile terminals, base station controllers, and mobile switching centers (MSC) which perform switching operations to direct calls to a mobile terminal via a base station controller and a base transceiver station.

Many deployments of IS-41 compliant systems use advanced intelligent networks (such as Signaling System 7 (SS7) networks) to carry signaling and control messages between an MSC and various other signaling points, such as a Home Location Register (HLR) and Service Control Points (SCPs). For example, the MSC may obtain profile information for a roaming mobile terminal from the HLR, such as which features the mobile terminal is allowed to use and whether the mobile terminal can place certain types of calls. As another example, in many situations the user of a mobile terminal is a subscriber to a pre-paid calling plan, and when an MSC is serving a pre-paid mobile terminal, the MSC needs to provide information to an SCP dedicated to pre-paid mobile terminals, e.g., for billing or accounting functions for such subscribers.

It so happens that the communication link between a serving or terminating MSC and the nodes on an intelligent network such as an HLR or pre-paid SCP fails. One example of such failure is where the signaling path between the MSC and the HLR or pre-paid SCP includes a satellite link, and the satellite either goes down for service or maintenance, a malfunction of the satellite occurs, or the orbital path of the satellite is such that it goes out of range of an antenna transmitting signals to the satellite or receiving signals from the satellite.

There is a need in the art for a method of operating an MSC such that when a signaling path between the MSC and a HLR or pre-paid SCP fails, the MSC may continue to provide at least limited telephone service for those mobile terminals that are registered with the MSC, in both serving and terminating capacities. This invention meets that need.

SUMMARY OF THE INVENTION

The following embodiments and aspects thereof are described and illustrated in conjunction with systems, tools and methods which are meant to be exemplary and illustrative, not limiting in scope.

This disclosure provides for several methods for processing a call in a MSC in the situation where a failure occurs in the signal path between the MSC and nodes in an intelligent network. Some embodiments are directed to situations where the call is a mobile-originated call. Other embodiments are directed to situations where the call is a mobile-terminated call.

In a first aspect, a method is provided of processing a pre-paid mobile-originated call in a MSC for a mobile terminal registered with the MSC in the event of a failure of a signaling link between the MSC and a service control point (SCP) in an intelligent network. The method includes the steps of: a) receiving a message at the MSC indicating a failure of the signaling link; b) marking the call as a post-paid call in a call detail record associated with the mobile terminal; and c) further processing the call, e.g., setting up, maintaining and/or tearing down the call.

The marking of the call as a post-paid call, even though the mobile is a pre-paid mobile terminal, allows the call to proceed while providing a mechanism for accounting for the call. For example, after the link is reestablished, the call detail record can be forwarded to an operations and maintenance center (OMC) which will use the data in the call detail record to bring the subscriber's account up to date.

In another aspect, a method is provided for processing a mobile-terminated call in an MSC in the event of a failure of a signaling link between the MSC and a home location register (HLR), wherein the call is intended to be terminated at a mobile terminal served by the MSC. The method includes the steps of: a) receiving a message indicating a failure of the signaling link; b) determining whether the mobile terminal is registered locally with the mobile switching center; c) if determining step b) is affirmative, obtaining a temporary local directory number for the mobile terminal; d) determining whether the mobile terminal is a pre-paid mobile terminal; e) if the determining step d) is affirmative, designating the call as a post-paid call in a call detail record associated with the mobile terminal; and f) further processing the call, e.g., setting up, maintaining and/or tearing down the call.

In still another aspect, a method is provided of processing a mobile-terminated call in an MSC in the event of a failure of a signaling link between the MSC and an SCP in an intelligent network, comprising the steps of: a) receiving a message indicating a failure of the signaling link; b) determining whether the mobile terminal is registered locally with the MSC; c) determining whether the mobile terminal is a pre-paid mobile terminal; d) if the determining steps b) and c) are both affirmative, marking the call as a post-paid call in a call detail record associated with the mobile terminal; and e) further processing the call, e.g., setting up, maintaining and/or tearing down the call.

In still another aspect, a method is provided of processing a mobile-terminated call in an MSC in the event of a failure of a signaling link between the MSC and an SCP in an intelligent network, wherein the call is terminated at a pre-paid mobile terminal, comprising the steps of: a) sending one or more messages to the SCP including information to be used to charge the mobile terminal for the call (e.g., to start and stop charging the call); b) receiving a message indicating a link failure when interacting with the SCP, e.g., a failure of the one or messages to be received by the SCP; and c) marking the call as a post-paid call in a call detail record associated with the mobile terminal.

In one embodiment, the signaling link between the MSC and the SCP or HLR includes a satellite link which fails. In one possible embodiment, the MSC is located on an island and the SCP, HLR and intelligent network are on the mainland and the MSC communicates with the SCP, SCP and intelligent network using the satellite link. Other embodiments are of course possible, and the link that fails can take other forms, such as optical fiber, network cabling, coax, etc. Furthermore, the cause or specific location of the failure is not important. For example, the failure could occur at the HLR and/or SCP.

In still another aspect, an improvement is provided to an MSC linked to an HLR and/or an SCP in an intelligent network via a signaling link that is capable of failure. The improvement includes software stored in a memory associated with the MSC for processing calls terminated to or originated by mobile terminals currently registered with the MSC, wherein the mobile terminals have a pre-paid service plan for wireless communication services with a wireless service provider. The software operates the MSC such that in the event of a failure of the signaling link, the MSC marks the calls as post-paid calls in a call detail record maintained by the MSC and allows limited call termination and call origination services for the mobile terminals notwithstanding the failure of the signaling link.

In addition to the exemplary aspects and embodiments described above, further aspects and embodiments will become apparent by reference to the drawings and by study of the following detailed descriptions.

DETAILED DESCRIPTION

Figure 1:
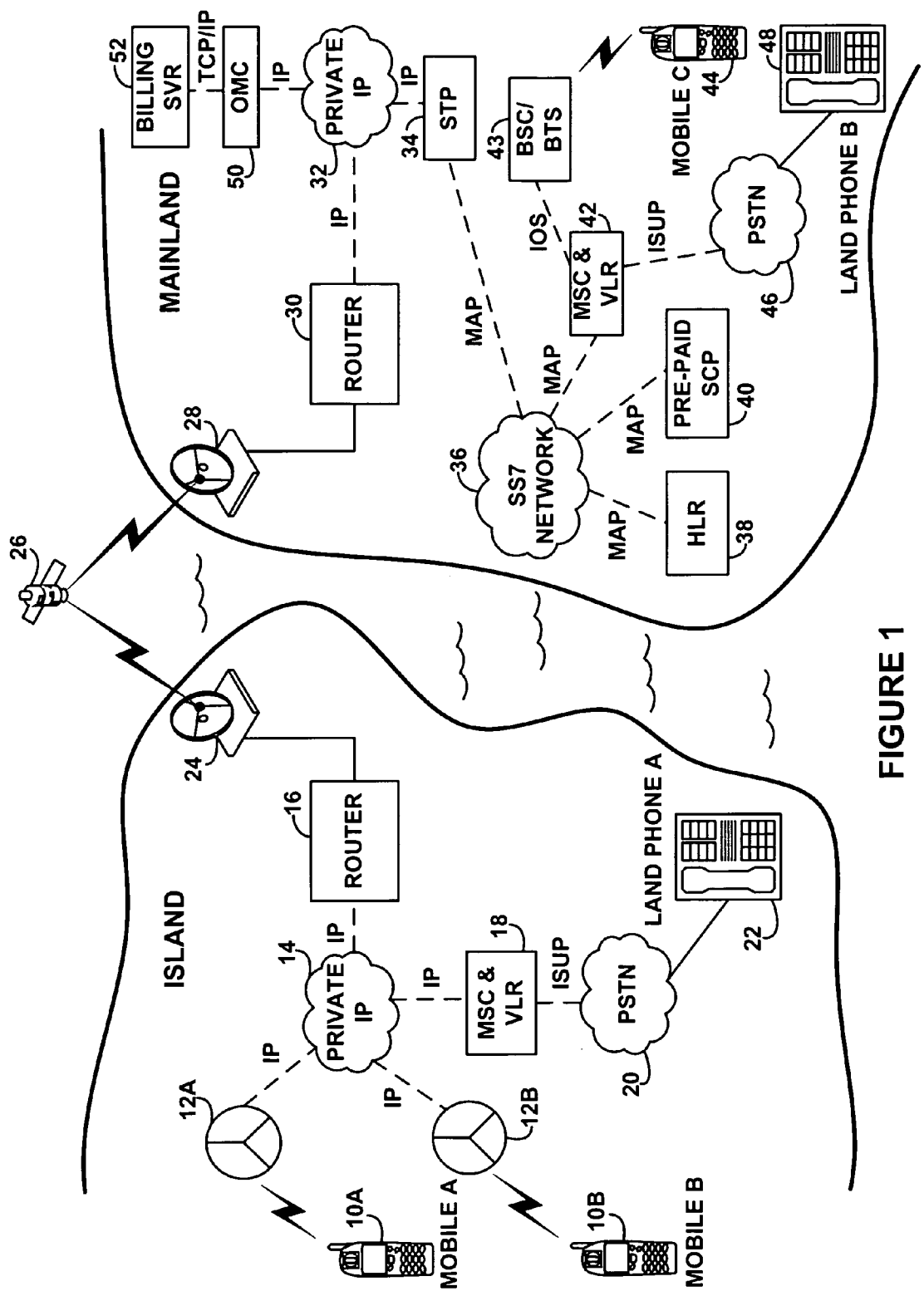
FIG. 1 is a diagram showing a telecommunications network including a mobile switching center MSC on an island and a signaling path between the MSC and a home location register (HLR) and pre-paid caller Signal Control Point (SCP) on the mainland using a satellite link. In the event the satellite link goes down, limited telephone service is provided for mobile terminals served by the MSC on the island, notwithstanding the loss of communication between the MSC and the HLR or SCP. Obviously, the use of the island and satellite link is exemplary and not limiting, as the invention is applicable to any situation where a serving or terminating MSC loses communication with a HLR and/or SCP.

With reference to FIG. 1, this disclosure provides for methods of providing at least limited telephone service for mobile terminals (e.g., cellular telephones 10A and 10B) that are registered with a mobile switching center (MSC) 18. The MSC 18 includes a visitor location register (VLR) which communicates with a home location register (HLR) 38 via a signaling path to be explained below. The mobile terminals 10 communicate via an air interface with a base transceiver station including antennas 12. Such base transceiver stations communicate over a private Internet Protocol network 14 to the MSC 18. The MSC 18 performs call switching functions for the mobile terminals, including setting up and tearing down calls. The MSC may communicate via ISUP protocol with a public switched telephone network (PSTN) 20 to allow calls to be placed to or from land line phones 22 on the island.

The IP network 14 is coupled to a router 16 having an antenna 24 for transmitting signaling and control messages between the MSC 18 via an orbiting satellite 26 and nodes on an intelligent network on the mainland. The media traffic (voice or data) between phones on the island and phones on the mainland typically will use another path, such as a fiber optic cable spanning between the island and the mainland. Signals are downlinked from the satellite at an antenna 28, where they are routed via router 30 to a private IP network 32 to a Signal Transfer Point 34 (essentially a router) which is coupled to an SS7 intelligent network 36. Mobile Application Part (MAP) signaling traffic in accordance with IS-41 is routed on SS7 network 36 to various functional entities, including a home location register (HLR) 38, a pre-paid Service Control Point (SCP), an MSC and Visitor Location Register (VLR) 42 in communication with another Base Station Controller (BSC) and Base Transceiver Station (BTS) subsystem 43 communicating with another mobile terminal 44. Furthermore, MSC and VLR 42 may communicate via ISUP protocol with PSTN 46 and allow calls to be placed to and from other land line phones 48.

The functionality of the various network elements shown in FIG. 1 in order to provide for telephony services for mobile terminals 10A and 10B (e.g., to allow a call to occur between them, for a call with land phone 22 or 48, or for a call to occur between them and mobile terminal 44) is known. What is new in this disclosure is methods by which the MSC 18 may continue to provide at least limited call origination and call termination switching services for the mobile terminals 10A and 10B in event that the signaling link between the MSC 18 and the HLR 38 or prepaid SCP 40 fails, as will be explained below.

To summarize, in the example embodiment FIG. 1, the MSC & VLR 18 are deployed on a remote island, MSC 18 and has a connection to a local PSTN switch in the PSTN 20. The STP 34, HLR 38 and Pre-paid SCP 40 are situated on the mainland. The MSC & VLR 18 and the STP 34 are connected via a satellite link (24/26/28) that provides a MAP signaling connection between the MSC and VLR 18 and the HLR 38 and Pre-paid SCP 40. When the satellite link is up, a pre-paid mobile subscriber (10A) on the remote island can do the following:

1) Register with the MSC. & VLR 18, which then gets the profile for the mobile 10A from the HLR 38 (using REG-NOT messages defined in IS-41).

2) Originate a pre-paid call to a local mobile (10B) and phones 22 on the island, or a remote mobile 44 and land phone 48 on the mainland. The MSC & VLR 18 interact with the HLR 38 and Pre-paid SCP 40 by sending/receiving MAP signaling messages via the satellite link (24/26/28) to set up, maintain and tear down the call.

3) Accept a pre-paid call from a local mobile (10B), land phone 22 on the island, or a remote mobile 44 and land phone 48 on the mainland. The MSC & VLR 18 interacts with the HLR 38 and Pre-paid SCP 40 by sending/receiving MAP signaling messages via the satellite link (24/26/28) to set up, maintain and tear down the call.

4) Invoke other features (e.g., Call Forwarding, 3-Way Calling, etc.) that are provided by the MSC to other mobiles or land phones.

When the satellite link (24/26/28) is down, the same pre-paid mobile subscriber 10A will not be able to make any calls using a MSC configured in accordance with prior art. However, the improved MSC and VLR 18 of this disclosure has the capability to detect the link failure via receipt of a message indicating such failure from the router 16 (or other component, e.g., controller for antenna 24). Moreover, the MSC 18 is provided with software which includes a decision making engine to complete limited incoming and outgoing calls. In particular, provided that the mobile 10A is registered with the MSC and VLR 18, the software in the MSC is such that the mobile terminals can a) Originate a post-paid call to a local mobile 10B or a land phone 22 on the island.

b) Accept a post-paid call from a local mobile 10B or a land phone 22 on the island.

c) Have Call Forwarding and 3-Way Calling features as long as the forwarding or the third party is on the island.

d) Treat the pre-paid mobile terminal 10A as a post-paid mobile terminal and continue to allow call original and call termination for telephone calls, as explained below.

In most commercial deployments using a satellite for MAP signaling traffic, the uptime of a satellite link (24/26/28) is not guaranteed. The features of this disclosure allow an operator of the MSC to turn pre-paid subscribers into post-paid ones and still generate revenue while the satellite link is down. This solution will also work with traditional SS7 land-based T1 or E1 links that fail, i.e., no satellite is in the signal path. Hence, FIG. 1 shows only one example of a signaling link that might fail.

This disclosure will now explain the methods and software present in the MSC/VLR 18 and explain how it continues to provide call functionality when it detects link failures and completes at least limited incoming and outgoing calls. Four scenarios are described in detail. The operations of the four scenarios described below are preferably carried out as software instructions stored in memory in the MSC 18 and executed by a suitable processor in the MSC.

1. Pre-paid Mobile Origination Scenario (MSC/VLR 18→SCP 40 Link is Down)

During a mobile origination call set up (call set up when mobile device 10A or 10B seeks to originate a call), the MSC 18 will retrieve the mobile's profile from the Visitor Location Register (VLR). The VLR is a functional entity defined by IS-41 that is commonly co-located with a MSC, but need not be co-located. The VLR contains profile data for mobile terminals that are registered with an MSC. The MSC 18 proceeds with the call origination attempt when the mobile's profile is available. The MSC 18 will then interact with the SCP 40 to set up a pre-paid call origination. If the link between the MSC 18 and the SCP 40 is down, the MSC will receive a notification with a link failure error code. Such error code could be generated by any node in the path between the MSC 18 and the SCP 40 and need not necessary be due to the failure of the satellite 26. The MSC 18 will record this failure in a billing record of the originating mobile. Despite this error, the MSC will continue processing this call. In particular, the MSC 18 will mark this origination as a post-paid call for the pre-paid subscriber in a Call Detail Record (CDR). The MSC then will set up, maintain and/or tear down the call in the normal fashion as if the link did not fail.

The billing record referred to above is an internal MSC data structure for TriggerAddressList and other internal call control data that are used for the duration of a mobile origination or mobile termination. The billing record is identified by a BillingID that is created by the MSC. The Call Detail Record is information displayed for an operator so that s/he can get operational detail of a call.

2. Pre-paid Mobile Termination Call Routing Scenario (MSC/VLR 18→HLR 38 Link is Down)

Consider next a scenario where a mobile terminal 10A is a pre-paid mobile terminal and the MSC 18 acts as a terminating MSC, e.g., where land phone 22 or mobile telephone 10B seeks to place a call to the mobile 10A. Mobile 10A is currently registered with the MSC 18. If the MSC 18 encounters a link failure error when determining the call routing information (including a Trigger Address List) from a HLR 38 for a pre-paid mobile termination, it will search the Mobile Record Database based on the dialed digits to see if it is terminating to a local pre-paid mobile, i.e., a mobile terminal that is registered with the MSC 18 and is pre-paid type of mobile. If so, the MSC 18 will then retrieve the mobile's Mobile Identification Number (MIN) from the mobile record database and sends this MIN to the VLR to retrieve a temporary local directory number (TLDN). Once the MSC 18 receives the TLDN and has determined that the mobile 10A is local (registered with the MSC), it will continue to process this call as a post-paid call (e.g., set up the call), and mark the CDR accordingly.

A Mobile Record Database, referred to above, is an internal MSC database that contains mobile information (e.g., MIN, ESN, MDN, Slot Cycle Index, etc.) for all the currently registered mobiles. Such a record is created after a mobile has successfully registered with our MSC. One can consider this database as a cache of more "permanent" type of data for a mobile subscriber. When a mobile subscriber leaves an MSC (i.e., roams into another MSC), its mobile record is removed from the database.

3. Pre-paid Mobile Termination Call Routing Scenario (MSC/VLR 18→SCP 40 Link is Down)

Consider next the scenario where the MSC 18 is terminating a call for a pre-paid mobile terminal 10A (e.g. for a call originating from land phone 22, land phone 48, or mobile 10B), and the MSC 18 encounters a link failure error while interacting with the SCP 40 for the mobile 10A. In this situation, it will determine if this pre-paid mobile 10A is registered locally (i.e., with the MSC 18), record the MSC-SCP link failure in a billing record of the mobile 10A, continue to process this call as a post-paid call, and mark the CDR accordingly.

4. Pre-paid Mobile Termination Call Completion Scenario ("MSC/VLR→SCP" Link is Down)

Consider next the situation where the MSC 18 is terminating a call to a pre-paid mobile terminal 10A, and the link between the MSC 18 and the SCP 40 is down after the call has been answered and before it is disconnected. When the local pre-paid mobile 10A answers and disconnects (later) the call, the MSC 18 will notify the SCP 40 to start and stop charging the call. If the MSC encounters a link failure error when interacting with the SCP 40, it will mark this call as a postpaid call in the CDR accordingly.

When the MSC marks calls as post-paid for pre-paid call subscribers, such information needs to be provided eventually to the service provider in order to conduct cost accounting for such calls, after the fact. Accordingly, the MSC 18 may provide call detail records to an operations and maintenance center (OMC 50), e.g., using batch processing techniques. The OMC 50 then forwards call detail records in electronic form to a billing server 52 of the service provider, e.g., using file transfer protocol, batch processing, or any other suitable technique. Such records could also be provided in some other form besides in electronic form, and the call records could be processed to provide summaries or abstracts of such records and such abstracts or summaries provided. The delivery of call detail records to the OMC 50 could be initiated immediately upon restoration of the link between the MSC and the SCP 40, or could be done on a periodic basis, e.g., daily.

Table 1 summarizes different how different types of mobile-originated calls are handled with a MSC 18 that implements the link-failure proof features of this disclosure.

TABLE 1

MOBILE ORIGINATION MATRIX

| Type of Origination Call Attempt | MSC to HLR/SCP link (✓: active; x: failed) | MSC Call Treatment |
|---|---|---|
| Post-paid | ✓ | Post-paid call. |
| Post-paid* | x | Post-paid call. |
| Pre-paid | ✓ | Pre-paid call. |
| Pre-paid* | x | Allow call origination attempt and mark this call as a post-paid call for the pre-paid subscriber. |

*Mobile profile record has to be available to the MSC.

Table 2 summarizes how different types of mobile-terminated calls are handled with a MSC 18 that implements the link-failure proof features of this disclosure.

TABLE 2

MOBILE TERMINATION MATRIX

| Type of Termination Call Attempt | MSC to HLR/SCP link (✓: active; x: failed) | MSC Call Treatment |
|---|---|---|
| Local post-paid | ✓ | Local post-paid call. |
| Intersystem post-paid | ✓ | Intersystem post-paid call. |
| Local post-paid* | x | Local post-paid call. |
| Intersystem post-paid | ✓ | Intersystem post-paid call |
| Local pre-paid | ✓ | Local pre-paid call. |
| Intersystem pre-paid | ✓ | Intersystem pre-paid call. |
| Local pre-paid* | x | Allow call termination and mark this call as a post-paid call for the pre-paid subscriber. |
| Intersystem pre-paid | ✓ | Allow call termination and mark this call as a post-paid call for the pre-paid subscriber |

*Mobile profile record has to be available to the MSC.

In Table 2, the term "local" means that both the originating and terminating mobile terminals are registered with the MSC 18. The term "intersystem" means that the terminating mobile terminal is registered with the MSC 18, but the originating mobile is not registered (e.g., the mobile is in a different geographic area and is served by a different MSC).

From the above discussion, it will be appreciated that an improved MSC 18 has been described which is linked to a HLR 38 and/or a signal control point (SCP) 40 in an intelligent network 38 via a signaling link 24/26/28. The improvement comprises software (described above, scenarios 1-4) which is stored in a memory associated with the MSC 18 for processing calls terminated to or originated by mobile terminals 10A and 10B currently registered with the MSC 18, wherein the mobile terminals have a pre-paid service plan for wireless communication services with a wireless service provider. In particular, the software operates the MSC such that in the event of a failure of the signaling link (e.g., via satellite 26 or otherwise), the MSC marks the calls as post-paid calls in a call detail record maintained by the MSC and allows limited call termination and call origination services for the mobile terminals, notwithstanding the failure of the signaling link.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

We claim:

1. A method of processing a pre-paid mobile-originated call in a mobile switching center for a mobile terminal registered with the mobile switching center in the event of a failure of a signaling link between the mobile switching center and a service control point (SCP) in an intelligent network, comprising the steps of:
    a) receiving a message at the mobile switching center indicating a failure of the signaling link;
    b) designating the call as a post-paid call in a call detail record associated with the mobile terminal; and
    c) further processing the call.

2. The method of claim 1 wherein the signaling link between the mobile switching center and the SCP comprises a satellite link.

3. A method of processing a mobile-terminated call in a mobile switching center in the event of a failure of a signaling link between the mobile switching center and a home location register, wherein the call is intended to be terminated at a mobile terminal served by the mobile switching center, comprising the steps of:
    a) receiving a message indicating a failure of the signaling link;
    b) determining whether the mobile terminal is registered locally with the mobile switching center;
    c) if determining step b) is affirmative, obtaining a temporary local directory number for the mobile terminal;
    d) determining whether the mobile terminal is a pre-paid mobile terminal;
    e) if the determining step d) is affirmative, designating the call as a post-paid call in a call detail record associated with the mobile terminal; and
    f) further processing the call.

4. The method of claim 3, wherein the signaling link between the mobile switching center and the home location register comprises a satellite link.

5. A method of processing a mobile-terminated call in a mobile switching center in the event of a failure of a signaling link between the mobile switching center and a service control point (SCP) in an intelligent network, comprising the steps of:
    a) receiving a message indicating a failure of the signaling link;
    b) determining whether the mobile terminal is registered locally with the mobile switching center;
    c) determining whether the mobile terminal is a pre-paid mobile terminal;
    d) if the determining steps b) and c) are both affirmative, designating the call as a post-paid call in a call detail record associated with the mobile terminal; and
    e) further processing the call.

6. The method of claim 5, wherein the signaling link between the mobile switching center and the SCP comprises a satellite link.

7. A method of processing a mobile-terminated call in a mobile switching center in the event of a failure of a signaling link between the mobile switching center and a service control point (SCP) in an intelligent network, wherein the call is terminated at a pre-paid mobile terminal, comprising the steps of:
- a) sending one or more messages to the SCP including information to be used to charge the mobile terminal for the call;
- b) receiving a message indicating a failure of the one or messages to be received by the SCP; and
- c) designating the call as a post-paid call in a call detail record associated with the mobile terminal.

8. The method of claim 7, wherein the message in step b) comprises a message indicating the failure of a communications link between the mobile switching center and the SCP.

9. The method of claim 7, wherein the communications link comprises a satellite link.

10. An improvement to a mobile switching center linked to a home location register and/or a service control point (SCP) in an intelligent network via a signaling link, the improvement comprising:
- software stored in a memory associated with the mobile switching center for processing calls terminated to or originated by mobile terminals currently registered with the mobile switching center, wherein the mobile terminals have a pre-paid service plan for wireless communication services with a wireless service provider,
- wherein the software operates the mobile switching center such that in the event of a failure of the signaling link, the mobile switching center designates the calls as post-paid calls in a call detail record maintained by the mobile switching center and allows limited call termination and call origination services for the mobile terminals notwithstanding the failure of the signaling link.

11. The improvement of claim 10, wherein the signaling link comprises a satellite link.

12. The improvement of claim 10, wherein the mobile switching center is linked to the home location register and/or the SCP via a satellite link.

13. The improvement of claim 10, wherein the failure of the link occurs after a call has been completed and during the process of the mobile switching center providing the SCP with information in order to bill the call to the mobile terminal, and the mobile switching center marks the call as a post-paid call in response to receiving a message indicating that the signaling link has failed.

14. The improvement of claim 10, wherein the mobile switching center provides the call detail record to an operation and maintenance center in communication with a billing system for the mobile terminals.

* * * * *